United States Patent [19]
Blauer et al.

[11] Patent Number: 5,626,949
[45] Date of Patent: *May 6, 1997

[54] BREATHABLE SHELL FOR OUTERWEAR

[75] Inventors: Stephen J. Blauer; Charles Blauer, both of Lexington, Mass.; Mark A. Mordecai, Hampton, N.H.; Richard Satterfield, Wellesley, Mass.

[73] Assignee: Blauer Manufacturing Company, Boston, Mass.

[*] Notice: The term of this patent shall not extend beyond the expiration date of Pat. No. 5,466,515.

[21] Appl. No.: 549,928

[22] Filed: Oct. 30, 1995

Related U.S. Application Data

[63] Continuation-in-part of Ser. No. 222,524, Apr. 4, 1994, Pat. No. 5,466,515.
[51] Int. Cl.$^6$ .................................................. B32B 3/00
[52] U.S. Cl. .................. 428/196; 428/195; 428/421; 428/422; 428/423.1; 428/304.4
[58] Field of Search .................... 428/195, 196, 428/246, 247, 252, 421, 422, 423.1, 304.4

[56] References Cited

U.S. PATENT DOCUMENTS

| | | | |
|---|---|---|---|
| 3,438,829 | 4/1969 | Coe | 156/235 |
| 3,651,520 | 3/1972 | Jacob | 2/272 |
| 3,703,730 | 11/1972 | Miller | 2/272 |
| 3,794,548 | 2/1974 | Wirth et al. | 161/89 |
| 3,804,700 | 4/1974 | Hoey | 161/160 |
| 4,148,958 | 4/1979 | Tischer et al. | 428/196 |
| 4,159,360 | 6/1979 | Kim | 428/195 |
| 4,173,199 | 11/1979 | Fassina | 118/212 |
| 4,304,812 | 12/1981 | Perkins | 428/247 |
| 4,380,604 | 4/1983 | Neuhaus et al. | 524/873 |
| 4,435,442 | 3/1984 | Hefele | 427/14.1 |
| 4,443,511 | 4/1984 | Worden et al. | 428/198 |
| 4,868,928 | 9/1989 | Norvell | 2/272 |
| 5,466,515 | 11/1995 | Blauer et al. | 428/246 |

FOREIGN PATENT DOCUMENTS 1201941  6/1967  United Kingdom.

OTHER PUBLICATIONS

*Enka and Pellon Teaming Up With Weatherproof Garment Lining*, Nonwovens Industry 34, May, 1988.
*Choosing Waterproof Wear*, Adapted from articles by Ellen Reagan in Outside Business Magazine, Apr. 1990 and Apr. 1992.

*Primary Examiner*—James J. Bell
*Attorney, Agent, or Firm*—Morse, Altman & Benson

[57] ABSTRACT

A shell for outerwear comprising an outer closely woven synthetic fabric, a relatively high-tensile-strength stratum printed on the inner face thereof and covering from 10 to 90% of the surface of the inner face, and fluorocarbon impregnation thereof.

11 Claims, 2 Drawing Sheets

BREATHABLE SHELL FOR OUTERWEAR

RELATED APPLICATION

This application is a continuation-in-part of application Ser. No. 08/222,524 entitled WEATHER PROTECTIVE FABRIC COMBINATION, OUTERWEAR CONSTRUCTED THEREFROM, filed on Apr. 4, 1994, in the names of Stephen J. Blauer and Charles Blauer, now U.S. Pat. No. 5,466,515.

FIELD OF THE INVENTION

The present invention relates to fabric constructions for outerwear, and, more particularly, to shell fabric constructions for coats, pants, jackets, boots, gloves, and other outer clothing that are designed for protection against inclement weather.

THE PRIOR ART

Clothing for inclement weather typically is constructed from fabrics or combinations of fabrics that strive to achieve seemingly inconsistent objectives. It is desired that such clothing be vapor permeable, water repellent, wind obstructing, stain resistant, dimensionally stable, externally durable, and internally comfortable. Vapor permeable membranes and/or tight weaving have been among the compromises needed to permit simultaneous vapor permeability, water repulsion, and wind obstruction. Special fabrics and/or coatings have been among the compromises needed for stain resistance, dimensional stability, external durability, and internal comfort. In particular, for example, the interstices within tightly woven fabric, which must remain open to achieve breathing, tend to become blocked by water proofing and wind blocking treatments.

Dimensional stability was typically achieved by a applying a continuous coating of material that covered substantially the entire inner surface of the outer fabric. A continuous coating has several shortcomings. Typically, the coating was applied by spreading it onto the fabric, which allowed air pockets to develop between the coating and the fabric. These air pockets had to be removed by hand using a flat edge, such as the edge of a yardstick, a procedure that is very inefficient and adds significant costs to the production of the fabric.

A second weakness is the lack of breathability of a continuous coating, which made these coated fabrics uncomfortable to wear. Because the coating covered the entire area of the fabric, there were no openings to allow the air to pass through the interstices of the fabric. To overcome this weakness, thin coatings and/or coatings made of a softer and weaker material were tried. However, these coatings had another problem in that they had a tendency to wash off during laundering. And the thicker coatings had a tendency to stiffen in colder weather, making them uncomfortable to wear.

Another weakness of the continuous coating is related to the lack of breathability. When the coated fabrics are cut to shape in the production process, a vacuum table is used to hold the fabric stable. If the fabric has a low breathability, only a small number of layers can be cut simultaneously because the vacuum generated by the table can reach through only several layers of coated fabric. If the coated fabric is more breathable, more layers of fabric can be held and cut simultaneously, making the production process more time and cost efficient.

Thus, there is an ongoing need for the improvement of shells for outerwear, especially in the way that dimensional stability is provided, for protection against inclement weather.

BRIEF DESCRIPTION OF THE INVENTION

The present invention relates to a shell for outerwear that achieves vapor permeability, water repellency, wind obstruction, stain resistance, dimensional stability, and external durability. More specifically, the present invention relates to a fabric construction comprising an outer fabric and a printed stratum.

The shell is composed of a woven, synthetic fabric which initially is impregnated with a protective material and printed on its inner face with a stratum composed of a high-tensile-strength tensile-strength material, and after which the protective coating is cured. The printed stratum covers from 10 to 90% of the surface area of the inner face of the fabric and may be in a variety of patterns.

External durability and stain resistance are provided by the woven synthetic fabric of the shell. Dimensional stability is provided by the printed stratum. Water repellency and wind obstruction are provided by the woven synthetic fabric of the shell. Vapor transmission is enabled by the interstices in the synthetic fabric of the shell and the openings in the pattern of the printed stratum.

Accordingly, the invention comprises the fabric structures and processes which are described in the following specification, the scope of which will be indicated in the appended claims.

BRIEF DESCRIPTION OF THE DRAWINGS

For a fuller understanding of the nature and objects of the present invention, reference is made to the accompanying drawings wherein.

DETAILED DESCRIPTION OF THE PREFERRED EMBODIMENT

Figure 1:
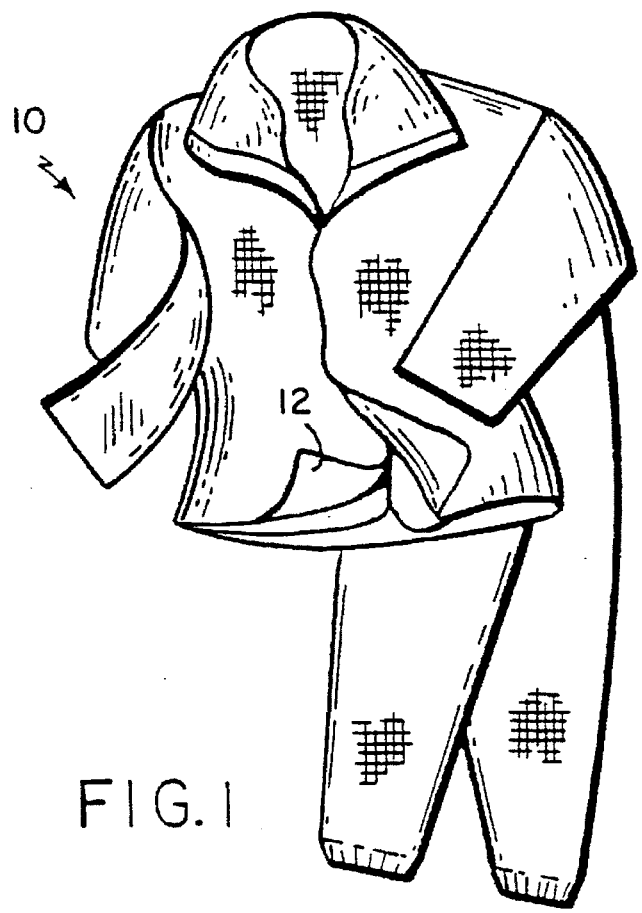
FIG. 1 is a perspective view of a storm coat and storm pants embodying the present invention.
Figure 2:
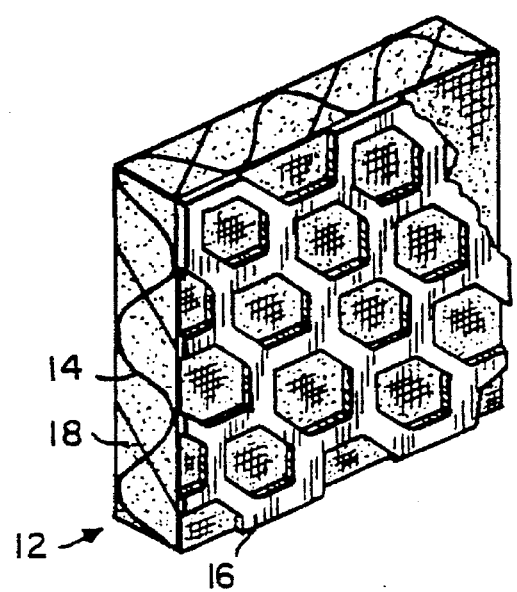
FIG. 2 is a grossly exaggerated view of one embodiment of the shell of the clothing of FIG. 1, cross-sectioned to illustrate fabric, impregnation, and molecular structure.

FIG. 1 illustrates an outdoor outfit 10 consisting of a jacket and pants that embody the shell of the present invention. As shown in FIG. 2, the shell 12 generally comprises a woven, synthetic polymer fabric 14 that is characterized generally by a low level of water absorption, for example, nylon, acrylic, or polyester. Two examples of preferred fabrics are detailed as follows:

EXAMPLE I

The Shell Fabric 14
 Cloth Type:
  200 Denier nylon (warp), and 3-ply 70 denier taslanized nylon (filling), plain weave Count:
warp: 114, filling: 52
Weight (uncoated):
5.5 ounces per square yard (±0.4 ounces)
Break Strength (pounds):
warp: 351 (minimum), filling: 156 (minimum)
Tear Strength (lbs.):
warp: 19 (minimum), filling: 8 (minimum)
Shrinkage:
warp: 2% (maximum), filling: 2% (maximum)
Color Fastness and Crocking:
Good

EXAMPLE II

The Shell Fabric 14
Cloth Type:
70 denier nylon (warp), and 2-ply 70 denier taslanized nylon (filling), plain weave
Count:
warp: 158, filling: 68
Weight: (uncoated):
3.0 ounces per square yard (±0.4 ounces)
Break Strength (pounds):
warp: 210 (minimum), filling: 100 (minimum)
Tear Strength (pounds):
warp: 4 (minimum), filling: 6 (minimum)
Shrinkage:
warp: 2% (maximum), filling: 2% (maximum)
Color Fastness and Crocking:
Good 20/40 hours After the fabric 14 is scoured and dyed, it is impregnated with a finishing composition 18, preferably a fluorocarbon release agent that will not clog the interstices of the fabric and that provides the shell 12 with a protective, water repellant treatment. One such protective material is a fluorocarbon solution sold by 3M under the trade designation SCOTCHGARD®. The finishing composition 18 is not cured until later in the fabric contruction process.

After the impregnation, a printed stratum 16 of a relatively high-tensile-strength, highly flexible elastomer, such as an acrylic urethane, is applied directly to the inner face of the fabric 14. Preferably, the elastomer consists of an aqueous blend of acrylic, urethane and silicone. The resulting stratum consists of a terpolymer which on drying contains about 12 to 30% urethane, about 1% silicone, and a roughly remainder of acrylic. During printing, the viscosity is adjusted so that it may be applied with a rotary screen printing head onto dyed fabric using a rotary screen having the desired pattern. Preferred coating weight add-on is in the range of 0.3 to 0.5 ounces per square yard. A formulation of this type is sold by Lyons Coatings, Inc., Franklin, Mass., under the trade designation Coating Compound 975-3.

The printed stratum 16 provides the shell 12 with dimensional stability, prevents seam slippage and unraveling, ensures the breathability of the shell 12, and maintain shell fabric appearance. Preferably, the pattern of the printed stratum 16 is characterized by solid portions that cover between 10 and 90% of the fabric 14 and weighs from 0.1 to 1 ounces per square yard.

Figure 3:
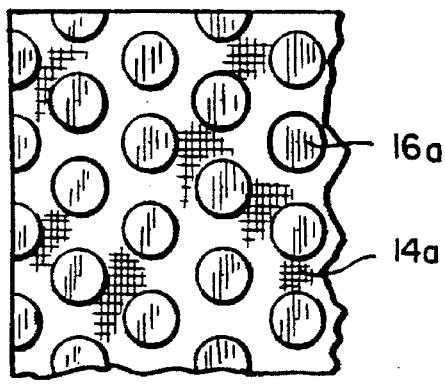
FIG. 3 illustrates one unconnected pattern that may be imprinted on the inner face of the shell.
Figure 4:
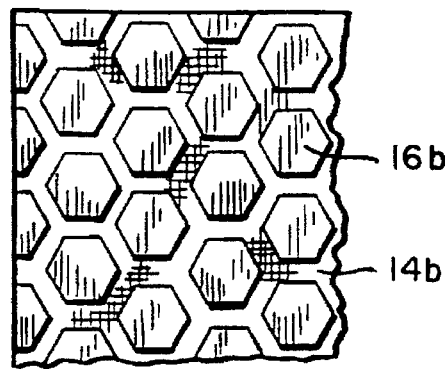
FIG. 4 illustrates a second unconnected pattern that may be imprinted on the inner face of the shell.
Figure 5:
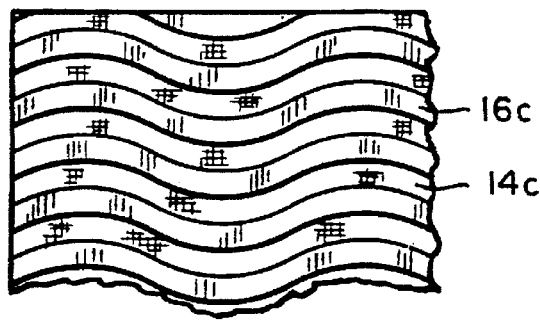
FIG. 5 illustrates a third unconnected pattern that may be imprinted on the inner face of the shell.

It has been discovered that a multiplicity of patterns, both unconnected and connected are satisfactory, provided that the coverage is from 10 to 90% of the fabric 14. Unconnected patterns are characterized by separate and discrete portions of elastomer. There are unconnected patterns that are unconnected in only one dimension, such as a set of wavy lines that extend from one edge of the fabric to another, and unconnected patterns that are unconnected in two dimensions, such as a set of dots. Examples of unconnected patterns are shown in FIGS. 3 to 5, and include dots 16a, hexagons 16b, and wavy lines 16c.

Figure 6:
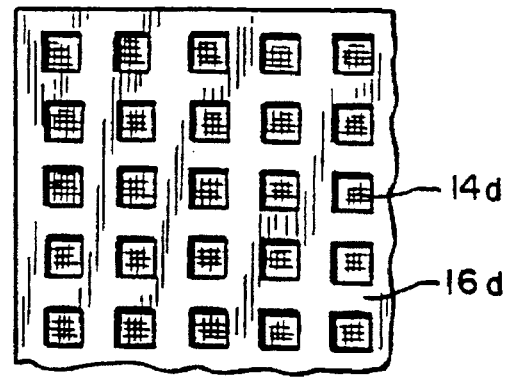
FIG. 6 illustrates one connected pattern that may be imprinted on the inner face of the shell.
Figure 7:
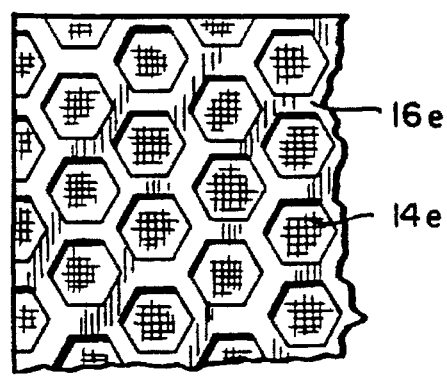
FIG. 7 illustrates a second connected pattern that may be imprinted on the inner face of the shell.
Figure 8:
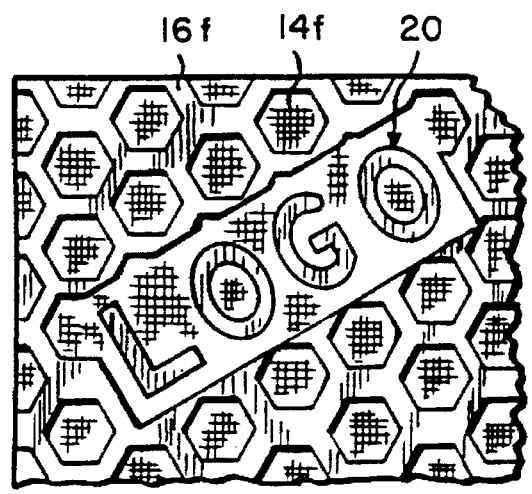
FIG. 8 illustrates a connected pattern with interruptions for a logo that may be imprinted on the inner face of the shell.

Connected patterns are patterns in which the elastomer is a mesh; that is, the elastomer is a continuous layer with openings that expose the inner face of the fabric 14. Examples of connected patterns are shown in FIGS. 6 and 7, and include contiguous, hollow, regular shapes with common sides, shapes such as squares 16d or hexagons 16e. In one preferred embodiment, shown in FIG. 7, the pattern is hexagonal, where the hexagonal shapes are hollow and contiguous with common sides, and the pattern has about a 50% coverage and 9 cells per linear inch. It may be noted that, even within connected patterns, there may be discontinuities 20 in the pattern 16f where, for example, a company logo might be placed, as shown in FIG. 8.

The printed stratum covering from 10 to 90% of the fabric has several advantages over the prior art. Previously, a softer and weaker urethane coating had to be used if the shell was to be breathable because the coating covered the entire surface of the fabric. The problem with the softer and weaker urethane is that it readily washed off in laundering. A harder and stronger urethane resulted in a shell that was too stiff to be truly comfortable, and that became even stiffer as the weather became colder. By introducing breaks or discontinuities in the material of the printed stratum, a harder and stronger urethane can be used. It is more durable, does not wash off in laundering, and does not make the shell too stiff for comfort.

In the typical production process of making outerwear, fabric is cut by an automatic cutter and a vacuum table. The vacuum table holds the fabric for cutting. With the previous coatings that covered the entire surface of the fabric, only a small number of layers could be held down and cut simultaneously because of the low porosity of the completely-coated fabric. With the printed stratum of the present invention, many more layers of fabric can be held down and cut simultaneously because the openings in the printed stratum result in a much more porous fabric so the vacuum suction can penetrate more layers. The effect of this is to save time and money in the manufacturing process.

Following application of the printed stratum 16, the finishing composition 18 is cured. The finishing composition 18 gives the shell a protective, water repellent treatment. It has been found that the durability of the printed stratum 16 and its adhesion to the fabric 14 is optimum when impregnation of the finishing composition 18 occurs before the printed stratum 16 is applied and curing takes place after the printed stratum 16 is applied.

OPERATION

The shell 12 operates in the following manner: Vapor permeability is enabled by the openings in the printed stratum 16 and the interstices of the shell fabric 14. Water repellency is achieved by the treated shell fabric 14. Wind obstruction is achieved by the shell fabric 14. Stain resistance and durability are achieved by the shell fabric 14 and the treatment to which it has been subjected 18.

What is claimed is:

1. A shell for outerwear comprising:
   (a) an outer woven synthetic fabric, a stratum printed on the inner face thereof, and release agent impregnation thereof;
   (b) said stratum having a pattern characterized by 10 to 90% coverage of the area of said outer shell fabric; and (c) said stratum being composed of a high tensile strength material that is adhesively bonded to said shell outer fabric and adapted to prevent said shell outer fabric from unraveling and to maintain the shape of said shell.

2. The shell of claim 1 wherein said stratum is composed of a urethane polymer.

3. The shell of claim 1 wherein said stratum is characterized substantially by a mesh.

4. The shell of claim 1 wherein said stratum is characterized substantially by a mesh with interruptions for at least one representation.

5. The shell of claim 1 wherein said stratum is characterized by a plurality of discrete portions.

6. The shell of claim 1 wherein said stratum is characterized by a plurality of discrete portions in a repeating configuration with interruptions for at least one representation.

7. A shell for outerwear comprising:

(a) an outer woven synthetic fabric, a stratum printed on the inner face thereof, and release agent impregnation thereof;

(b) said stratum having a pattern characterized by 10 to 90% coverage of the area of said outer shell fabric;

(c) said stratum being composed of a high tensile strength material that is adhesively bonded to said shell outer fabric and adapted to prevent said shell outer fabric from unraveling and to maintain the shape of said shell;

(d) said shell outer fabric being selected from the class consisting of nylon, acrylic, and polyester;

(e) said pattern being composed of a urethane polymer; and (f) said release agent being a fluorocarbon.

8. The shell of claim 7 wherein said stratum is characterized substantially by a mesh.

9. The shell of claim 7 wherein said stratum is characterized substantially by a mesh with interruptions for at least one representation.

10. The shell of claim 7 wherein said stratum is characterized by a plurality of discrete portions.

11. The shell of claim 7 wherein said stratum is characterized by a plurality of discrete portions in a repeating configuration with interruptions for at least one representation.

* * * * *

UNITED STATES PATENT AND TRADEMARK OFFICE
CERTIFICATE OF CORRECTION

PATENT NO. : 5,626,949
DATED      : May 6, 1997
INVENTOR(S) : Stephen J. Blauer, et. al.

It is certified that error appears in the above-indentified patent and that said Letters Patent is hereby corrected as shown below:

Title page, item [73], Assignee: should read--Blauer Manufacturing Company, Inc.--.

Signed and Sealed this

Twenty-first Day of October 1997

*Attest:*

BRUCE LEHMAN

*Attesting Officer*  *Commissioner of Patents and Trademarks*